April 16, 1929.　　　E. B. NICHOLS　　　1,709,147
FLUID METER
Filed July 26, 1927　　　6 Sheets-Sheet 3

INVENTOR
Edgar B. Nichols
BY
his ATTORNEYS

April 16, 1929.  E. B. NICHOLS  1,709,147
FLUID METER
Filed July 26, 1927   6 Sheets-Sheet 4

INVENTOR
Edgar B. Nichols
BY
Crompton & Griffith
his ATTORNEYS

April 16, 1929.　　　E. B. NICHOLS　　　1,709,147
FLUID METER
Filed July 26, 1927　　　6 Sheets-Sheet 5

INVENTOR
Edgar B. Nichols
BY
his ATTORNEYS

Patented Apr. 16, 1929.

1,709,147

UNITED STATES PATENT OFFICE.

EDGAR B. NICHOLS, OF ROCHESTER, NEW YORK, ASSIGNOR TO THE PFAUDLER CO., OF ROCHESTER, NEW YORK, A CORPORATION OF NEW YORK.

FLUID METER.

Application filed July 26, 1927. Serial No. 208,603.

The present invention relates to fluid meters of the class adapted for measuring the flow of a fluid or liquid and has for one object to provide an efficient and accurate device of this class which is suitable for use with apparatus in which the liquid is circulated by air or other gaseous pressure and in which provision is made for separating the liquid and gas to prevent operation of the device by gaseous pressure.

Another object of the invention is to provide a fluid meter of the above type conforming with sanitary standards as required, for example, in the measurement of milk or other liquid foods and embodying a construction comprising a minimum number of parts accessibly arranged and adapted to be quickly and readily disassembled and cleaned.

Another object of the invention is to provide a fluid meter of the above described nature having its parts constructed and arranged to effect complete drainage of the liquid by gravity whenever the supply is discontinued.

To these and other ends the invention resides in certain improvements and combinations of parts, all as will be hereinafter more fully described, the novel features being pointed out in the claims at the end of the specification.

In the drawings.

Similar reference numerals throughout the several views indicate the same parts.

The embodiment of the invention herein disclosed by way of illustration shows the application of the principles involved to liquid metering or measuring apparatus of the positive type adapted for use with a supply of liquid circulated under gaseous pressure or in any other manner and is particularly adapted for use in measuring milk or other liquid foods requiring sanitary handling. In other words, the present embodiment represents a construction in which all of the parts are arranged or adapted to afford complete drainage of the liquid from the meter after use and for being readily disassembled to afford access for thorough cleaning of the parts.

The present invention is in the nature of an improvement on that shown in my copending application for fluid meters, filed August 24, 1926, and bearing Serial No. 131,294.

Figure 1:
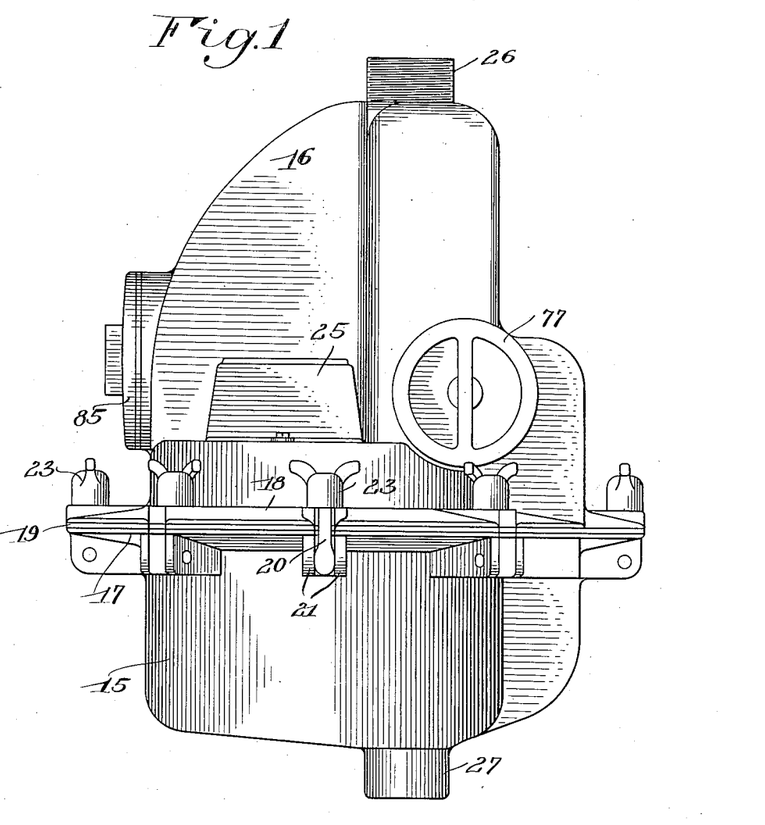
Figure 1 is a side elevation of a fluid meter embodying the present invention.
Figure 2:
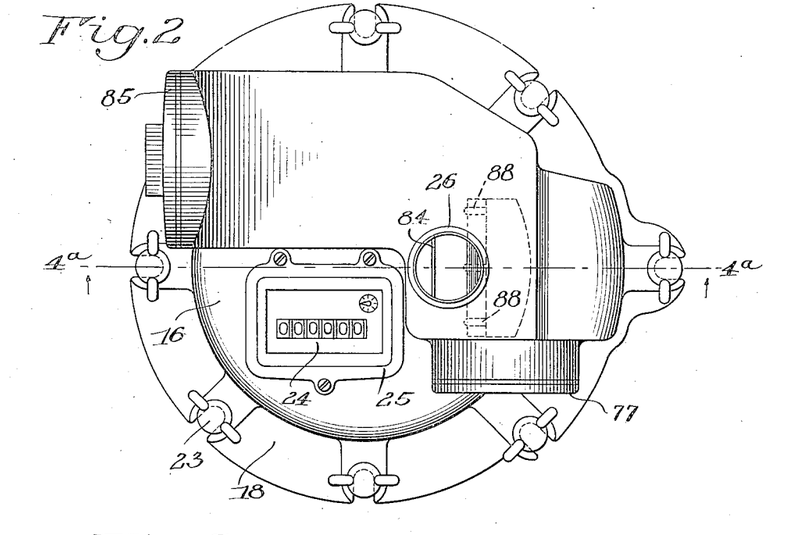
Figure 2 is a top plan view of the same.

Referring more particularly to the drawings, the present embodiment comprises a compact, self-contained casing having a base portion 15 and a cover portion 16 formed at their meeting edges with flanges 17 and 18, respectively, and between which is interposed a gasket 19 to afford a fluid-tight joint. In order to provide for quick detachment of the cover portion for access to the interior of the meter, the upper and lower casing portions are connected by a series of swing bolts 20 each pivoted between a pair of lugs 21 under the flange 17 of the base portion and engaging in a recess 22 in the flange 17 of the cover portion, the bolts being provided with wing nuts 23 for clamping the casing portions together. The base portion of the casing contains a positive liquid measuring device more fully described hereinafter, such device including a piston or moving part actuated by the transmitted liquid and having a driving connection with the registering mechanism indicated, generally, at 24 in Figure 2, the indicating parts of which are contained in a casing or housing 25 carried by the upper section 16 of the meter. The registering mechanism may be of any known or suitable type and its particular construction forms no part in the present invention.

In the use of positive liquid meters as heretofore known, various difficulties have been experienced due to interference with the accurate functioning of the apparatus by the air or other gas trapped in the liquid, particularly, in connection with equipment in which the liquid is subjected to or circulated by air or other gaseous pressure which has a tendency to over-drive the meter. It has been found that this difficulty can be overcome by separating the liquid and gas or air within the meter and by-passing it about the measuring device under control of suitable automatic valve means, operating when the supply of liquid ceases to substantially close the liquid path against the gas and to close the by-pass during the supply of liquid.

The upper section 16 of the meter is provided with a nipple 26 for connection with a supply pipe not shown and the lower section 15 is provided with a nipple 27 arranged to receive a discharge pipe through which the measured liquid is adapted to flow. The upper section is provided preferably with an L-shaped separation chamber 28 and the lower section with a measuring chamber 29. An intermediate chamber or passage 30 for the liquid is provided between the upper and lower chambers. The upper wall 31 of the intermediate chamber constitutes the bottom of the L-shaped chamber 28 while a disc or plate 32 forms the lower wall of the intermediate chamber. The bottom wall 31 of the chamber 28 is provided with a discharge opening surrounded by a valve seat 33 for the passage of the liquid from the upper to the intermediate chamber, said opening being normally closed by a rotary valve indicated, generally, at 34 which is mounted to oscillate in a cylindrical casing 35, the walls of which are preferably formed integral with the upper section 16. The lower wall 32 of the chamber 30 forms a cover for a cage 36, the upper flange of which is adapted to rest upon an annular shoulder 37 formed inwardly of and adjacent the top of the lower section 15.

Figures 4, 5:
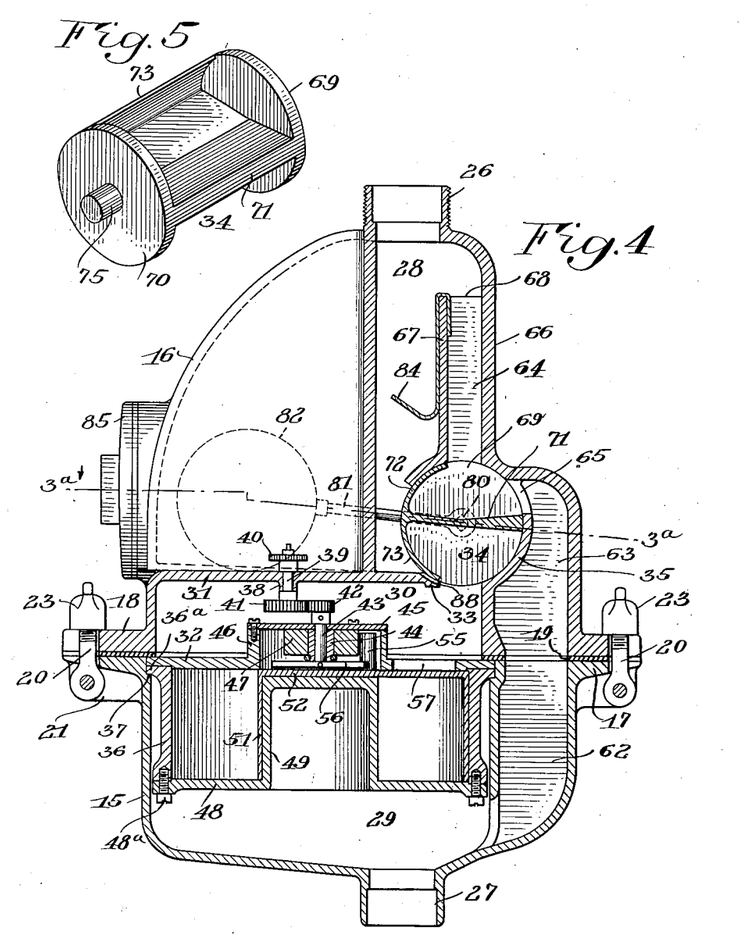
Figure 4 is a sectional elevation taken substantially on line $4^a$—$4^a$ of Figure 2.
Figure 5 is a detail perspective view of the fluid control valve shown in Figure 4.

The wall 31 is provided with a boss 38 forming a bearing for a spindle 39, the upper end of which is provided with a pinion 40 for driving the measuring device. The lower end of the spindle is provided with a spur gear 41 meshing with the pinion 42 on a spindle 43 journaled in a bearing 44 secured to a removable cover plate 45 superimposed upon a cylindrical extension 46 on the plate 32 as shown in Figure 4. The spindle bearing 44 has journaled thereon a roller 47 which forms a guide for a measuring piston as hereinafter described.

Figures 8, 9, 10:
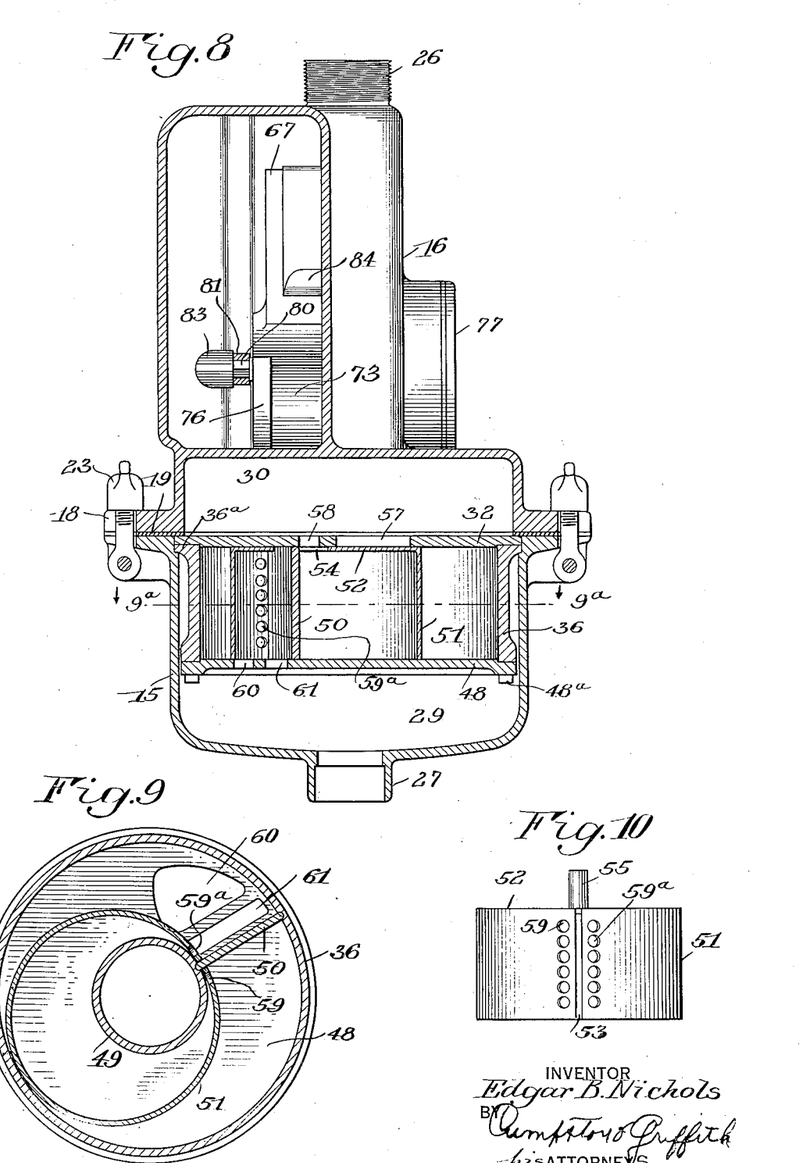
Figure 8 is a sectional elevation taken substantially on line $8^a$—$8^a$ of Figure 12.
Figure 9 is a sectional plan taken on line $9^a$—$9^a$ of Figure 8.
Figure 10 is a view in elevation of a measuring piston forming a part of the measuring mechanism.
Figure 11:
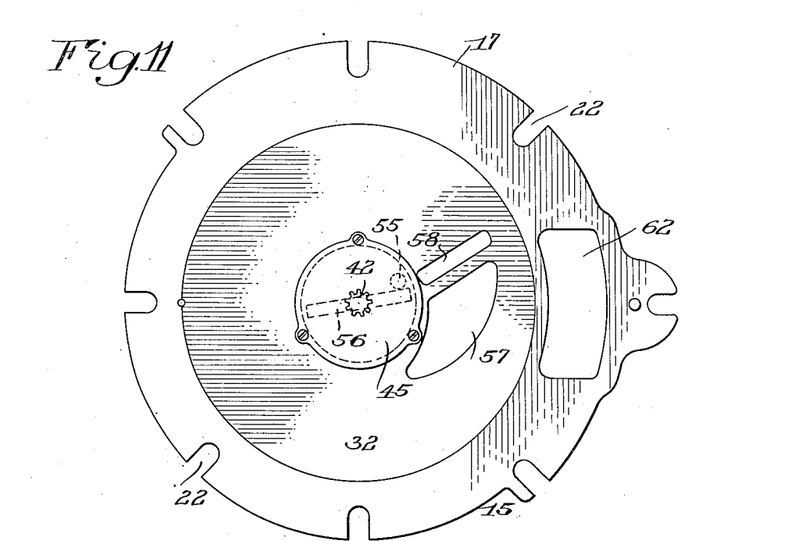
Figure 11 is a top plan view of the lower section of the casing and parts supported therein.

The measuring device proper is of a positive and accurate character and includes the cage 36 and bottom plate 48, which is preferably secured thereto by screws 48ª in order that it may be readily detached therefrom. The bottom plate 48 has an upwardly projecting central boss 49 of generally cylindrical shape extending to a point adjacent the bottom of the cover plate 32. A partition 50 extends between the side wall of the cage 36 and the boss 49 as shown in Figure 9. The boss 49, partition 50 and other parts form guides for a horizontally oscillating piston 51 of generally cylindrical shape with a top wall 52, the bottom of the piston being open and resting on the bottom plate 48 of the cage and extending about the boss 49. The top of the piston rests upon the top of the boss 49 and extends between the latter and the bottom of the cover plate 32 with the partition 50 embraced in the piston side wall slot 53 as shown. The piston cover is formed with an elongated curved recess 54 and carries a vertically projecting stud 55 at its center, playing between the cylindrical portion 46 of the cover and the guide roller 47.

It will be seen that while the piston may not rotate, it is adapted to oscillate horizontally about the cage boss 49 while the slot 53 of the piston travels back and forth along the partition 50 and the stud 55 describes a circle in engagement with a bar 56 on the lower end of the spindle 43 for driving the registering mechanism, such motion of the piston being produced by the flow of the liquid as hereinafter described.

Figure 6:
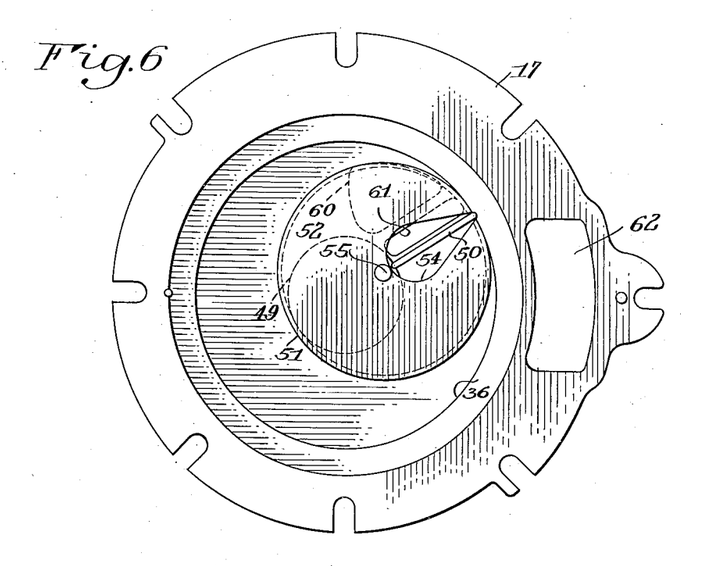
Figure 6 is a top plan view of the lower section of the casing with the cover plate for the piston cage removed.
Figure 12:
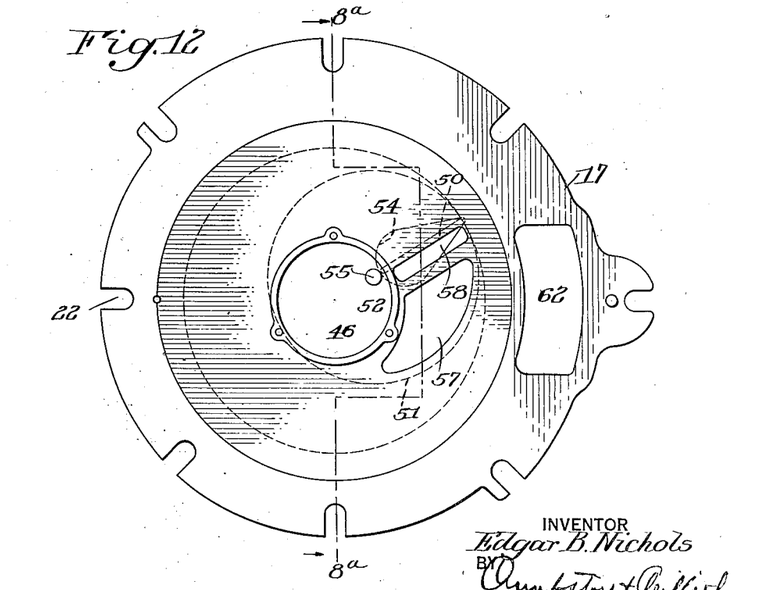
Figure 12 is a plan view similar to Figure 11 with a portion of the drive for the registering mechanism removed.

The cover plate 32 of the piston cage forms a substantially tight closure with the side walls of the casing base and the flange 36ª at the upper side of the cage forms a liquid tight joint with the shoulder 37 of the lower section of the meter so that milk or other liquid passing from chamber 28 into the intermediate chamber 30 cannot escape except through openings 57 and 58 in the cover plate 32. These openings are at one side of the partition 50 so that the liquid passing through the same enters the piston through its recess 54 and through side openings as at 59 and enters between the side wall of the piston and side wall of cage 36 for a portion of the path of movement of the piston. The pressure of such liquid tends to rotate the piston from the position shown in Figure 12 in a clockwise direction through the position shown, for example in Fig. 6. The bottom plate of the piston cage is provided with similar ports 60 and 61, Figure 9 which are uncovered by the piston in its movement so that the liquid on the other side of the piston and that within the same is discharged through openings 60 and 61 into the chamber 29 and outwardly through the nipple 27 at the bottom thereof. The piston is provided at this side with openings 59ª similar to openings 59 to assist in the discharge of the liquid within the same. The piston oscillates continuously in this manner as long as liquid is supplied and forms a positive closure between the inlet and outlet portions of its cage so that the number of its oscillations forms an accurate measure of the quantity of liquid transmitted, this form of measuring cage and piston being known in the art. As the piston oscillates, its stud 55 drives the bar 56 and the registering mechanism through the connections described.

It will be noted that the open construction of the piston and the arrangement of the openings 57 and 58, 60 and 61 provide for complete drainage of the liquid from the chamber 30 and from the measuring device into the base of the casing. The bottom of the casing base 15 is sloped downwardly to a substantially central point whereby to better drain the same through the nipple 27.

The base of the casing is provided with a by-pass 62 communicating with a by-pass 63 in the upper section of the casing which communicates with another by-pass 64 leading from a point adjacent the top of the upper section into the valve casing 35 and communicating with the by-pass 63 through a port 65 as indicated in Figure 4. The by-pass 64 is formed by the oppositely disposed walls 66 and 67 connected by end walls 68. Thus an air discharge passage is formed leading from a point adjacent the top of the chamber 28 to the bottom of the chamber 29 in the lower section 15 of the casing. The by-pass 64 is located at one side of the path of flow of the liquid through the nipple 26 so as to avoid discharging of the liquid through said by-pass. The liquid control valve indicated, generally, at 34 is provided with disc-like end portions 69 and 70 which are connected by a wall or partition 71 as shown in Figures 4 and 5. The ends 69 and 70 are also connected by upper and lower curved valve portions 72 and 73, respectively which conform to the curvature of the inside diameter of the valve casing 35. The valve portion 73 normally engages the valve seat 33 to close the discharge opening leading from the separation chamber 28 to the intermediate chamber 30 as when the valve is in the position shown in Figure 7. The upper portion 72 thereof is adapted to close the by-pass 64 to prevent the discharge of liquid therethrough when the receiving chamber 28 becomes substantially filled. The ends 69 and 70 of the valve are provided with trunnions 74 and 75 respectively. Trunnion 74 is supported by a wall 76 extending into the chamber 28, the wall being recessed to receive the end 69 of the valve as shown in Figure 3.

Figure 3:
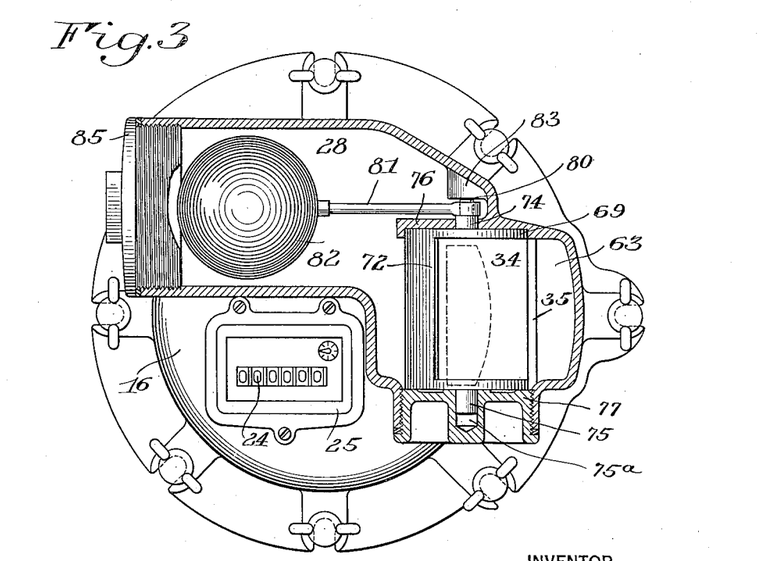
Figure 3 is a sectional plan taken on line $3^a$—$3^a$ of Figure 4.

The opposite trunnion 75 is journaled in a removable closure 77 which is threaded into the wall of the casing as shown also in Figure 3. Trunnion 74 is provided with a squared end 80 for receiving a rod 81 having a correspondingly shaped opening, the rod carrying a float 82 disposed within the separation chamber 28. The squared end of the trunnion 74 extends through the squared opening in the end of the rod, said end being held against lateral displacement in an outward direction by a lug 83 projecting inwardly from the wall of the chamber 28.

A baffle plate 84 is disposed upon the inner side wall 67 of the air discharge passage 64 and projects transversely thereof and intersects the axis of the nipple 26 whereby to project into the path of the inflowing liquid, preferably at a point slightly above the valve 34. The purpose of the baffle plate is to afford a more uniform distribution of the liquid within the chamber 28 in order to protect the float and avoid undue influencing of the movement of the same from its different positions. For example, without the baffle to spread or distribute the inflowing liquid the initial stream entering the chamber 28 would pass downwardly and under the float and tend to quickly raise the same so that the valve portion 72 would close the by-pass 64 before the air could escape from the chamber. The more even distribution of the liquid by the use of the baffle not only overcomes this difficulty but insures a gradual movement of the float to and from its valve closing positions.

The separation chamber 28 is provided with an end closure 85 which when removed permits the float to be inserted therein with the end of the rod 81 in position to receive the squared portion 80 of the trunnion 74 of the valve 34, the latter being inserted within the chamber through the opening sealed by the closure 77 as shown in Figure 3.

Complete drainage of the milk or liquid receiving chamber 28 is afforded by providing grooves or openings 88 in the valve seat 33, or at other suitable points in the bottom 31 of said chamber, so that any liquid retained therein after the valve portion 73 becomes seated will be quickly drained into the chamber or passage 30 and thence into the bottom of the casing as explained above.

Figure 7:
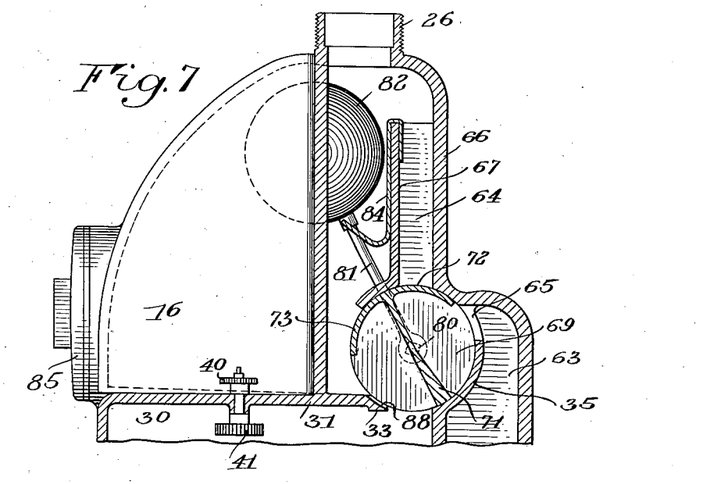
Figure 7 is a fragmentary sectional elevation through the upper portion of the casing similar to the upper half of Figure 4 with the float shown in raised position.

In the operation of the device when milk or other liquid is supplied to the meter through its inlet 26 the liquid tends to fill the separation chamber and to raise the float to move the valve 34 from the position shown in Figure 4 to that shown in Figure 7 whereby the liquid is permitted to escape into the chamber 30 from whence it passes through openings 57 and 58 to oscillate the piston. During the raising of the float any quantity of air or other gas entering the meter may escape through the passage 64 and port 65 and thence through passages 63 and 62 to the bottom of the casing 15. Thus the air is by-passed without influencing the operation of the piston so that the registering mechanism will accurately register the actual quantity of liquid transmitted. When the separation chamber is filled with liquid or in other words when a full flow of liquid is supplied to the chamber 28 the float operated valve is raised to close the by-pass 64 to prevent the escape of liquid through the latter. In case of the entrance of any air, however, the valve will be operated by the descent of the float to open the passage 64 whereby to by-pass the air as described, but will also operate at all times to prevent escape through the by-pass of the rising liquid. When the flow of liquid is discontinued the valve is rotated upon its seat by the descent of the float to close the discharge passage leading from the chamber 28 to the chamber 30, so that a sufficient quantity of air to operate the measuring device is prevented from passing therethrough. Even when the valve 34 closes the outlet opening leading from the chamber 28 the liquid may drain through ports 88 and through the measuring device into and from the bottom of the casing so that the apparatus is completely self-drained as is necessary to meet the sanitary requirements in the handling of various liquid foods as in the measuring of milk.

It is to be noted that the upper and lower portions of the casing may be conveniently and quickly detached by throwing off the swing bolts 20. Furthermore, the apparatus comprises a comparatively small number of parts practically all of which are readily removable from the casing for cleaning as is necessary to meet sanitary requirements. The invention thus provides a self-contained compact mechanism with provision for the separation of air from the liquid and with automatic valve means to effect coordinating closing of the liquid discharge passage controlled by the valve and the air by-pass as well. The meter is thus adapted to operate accurately under either a high or low pressure without interference by air mixing with the milk and when the use of the meter is discontinued or at suitable intervals during its use its parts may be readily disassembled and cleaned or sterilized as desired.

I claim as my invention:

1. In a fluid meter, the combination of a casing having upper and lower liquid receiving and discharge chambers and an intermediate chamber therebetween, a measuring device arranged in the lower chamber to transmit the fluid and to be actuated thereby, a registering mechanism driven by said device, the casing having an air discharge passage leading from the upper to the lower chamber, said upper chamber having a fluid discharge opening leading to the intermediate chamber and the latter having an outlet leading to the measuring device and an automatic valve having a position at which it is adapted to close said air discharge passage at a point between its ends and being movable to close said opening when the liquid falls to a predetermined level within the upper chamber.

2. In a fluid meter, the combination of a casing having liquid receiving and discharge chambers, said receiving chamber having a liquid discharge passage leading to the discharge chamber, said casing having an air discharge passage for by-passing air from the receiving to the discharge chamber, a rotary valve within the casing adapted to normally close the liquid discharge passage and arranged for movement to open the same and to close the air discharge passage at a point between its ends, a float within the liquid receiving chamber operatively connected with the valve, a measuring device arranged within the liquid discharge chamber and adapted to transmit the fluid and to be actuated thereby and a registering mechanism driven by said device.

3. In a fluid meter, the combination of a casing including upper and lower sections, said sections having fluid receiving and discharge chambers respectively, the sections cooperating to form an intermediate chamber having an opening connecting with the receiving chamber and also cooperating to form an air discharge passage for by-passing air from the upper end of the receiving chamber to the discharge chamber, a valve for controlling said opening and said air discharge passage, a float within the fluid receiving chamber for operating said valve, the latter serving in all positions to cut off communication between said opening and said air discharge passage, a measuring device arranged in the discharge chamber to transmit the fluid and to be actuated thereby, a registering mechanism carried by the upper section of the casing and means including gearing located within the intermediate chamber adapted to be actuated by the measuring device to drive the registering mechanism.

4. In a fluid meter, the combination of a casing, a fluid measuring device arranged in said casing to transmit the fluid and to be actuated thereby, a registering mechanism driven by said measuring device, said casing having a separation chamber overlying the measuring device and having a discharge passage leading to the same, the casing also having an air by-pass leading from the upper portion of the separation chamber to a point below the measuring device, a valve disposed between the ends of the by-pass and a float within the separation chamber for actuating said valve, the latter serving to alternately open and close said by-pass and said discharge passage.

5. In a fluid meter, the combination of a casing, a fluid measuring device arranged in said casing to transmit the fluid and to be actuated thereby, a registering mechanism arranged to be driven by said measuring device, said casing having a separation chamber overlying the measuring device and having a fluid inlet opening adjacent its top and a discharge passage leading to the measuring device, the casing also having an air by-pass leading from the upper portion of the separation chamber to a point below the measuring device, a valve disposed between the ends of the by-pass, a float within the separation chamber for actuating said valve, the latter serving to alternately open and close said by-pass and said discharge passage and a baffle plate disposed within the separation chamber below said inlet opening and in alignment therewith.

6. In a fluid meter, the combination of a casing, a fluid measuring device arranged in said casing to transmit the fluid and to be actuated thereby, a registering mechanism arranged to be driven by said measuring device, said casing having a separation chamber overlying the measuring device and also having a cylindrical valve chamber at one side of the separation chamber with fluid inlet and outlet passages leading to the measuring device, the casing having an air by-pass leading from the upper portion of the separation chamber through said valve chamber to a point below the measuring device, an oscillatory valve disposed within said cylindrical chamber, a float within the separation chamber for actuating said valve, the latter serving when opening said fluid inlet passage to close the air passage leading to the valve chamber and means for draining the separation chamber when the valve is in position to close said inlet passage.

7. In a fluid meter, the combination of a casing, a fluid measuring device arranged in said casing to transmit the fluid and to be actuated thereby, registering mechanism driven by said device, said casing having a liquid receiving chamber at one side of the measuring device provided with an inlet opening, and also having a cylindrical valve chamber located at one side of the liquid receiving chamber and provided with a discharge passage communicating with the measuring device, the casing having a by-pass leading from the upper portion of the receiving chamber through said valve chamber and downwardly to the bottom of the casing a baffle plate within the receiving chamber directly beneath said inlet opening and a float operated rotary valve within the valve chamber adapted upon raising of the float to open said discharge passage and to close said by-pass, said valve having a partition arranged to prevent communication between the by-pass and discharge passage in all positions of the valve.

8. In a fluid meter, the combination of a casing having inlet and outlet passages, a fluid measuring device arranged in said casing to transmit the fluid and to be actuated thereby, registering mechanism driven by said device, said casing having a liquid receiving chamber above the measuring device, and also having a cylindrical valve chamber at one side of the receiving chamber provided with a discharge passage communicating with the measuring device, the casing having a by-pass leading from the upper portion of the receiving chamber downwardly to said outlet passage, a rotary valve within said valve chamber having end portions rotatably supported by opposite walls of the valve chamber and a float within said liquid receiving chamber connected with said valve and adapted when being raised by the liquid to a predetermined position to cause the valve to open said discharge passage and to close said by-pass.

9. In a fluid meter, the combination of a casing having inlet and outlet passages, a fluid measuring device arranged in said casing to transmit the fluid and to be actuated thereby, registering mechanism driven by said device, said casing having a liquid receiving chamber at one side of the measuring device, and a valve chamber at one side of the receiving chamber having a discharge passage communicating with the measuring device, the casing having a by-pass leading from the upper portion of the receiving chamber downwardly through the valve chamber to said outlet passage, an oscillatory valve member within said valve chamber including opposed valves and a transverse partition connected therewith, said member having its opposite ends rotatably supported by opposite walls of the valve chamber, a float within said liquid receiving chamber connected with said valve member and adapted when raised by the liquid to cause one of said valves to open said discharge passage and the other to close said by-pass, said partition in all positions of the valves serving to cut off communication between the by-pass and discharge passage.

10. In a fluid meter, the combination of a casing having inlet and outlet passages, a fluid measuring device arranged in said casing to transmit the fluid and adapted to be actuated thereby, registering mechanism driven by said device, said casing being provided with a liquid receiving chamber at one side of the measuring device and having a valve chamber at one side of the receiving chamber provided with a discharge passage communicating with the measuring device, the casing having a by-pass leading from the upper portion of the receiving chamber downwardly to said outlet passage, said valve chamber having end walls one of which is detachable from the casing, an oscillatory valve within the second mentioned chamber having trunnions journaled in said end walls and a float within the first mentioned chamber connected with the valve and adapted when being raised by the liquid to a predetermined position to cause the valve to open said discharge passage and to close said by-pass.

11. In a fluid meter, the combination of a casing having inlet and outlet passages, a fluid measuring device arranged in said casing to transmit the fluid and to be actuated thereby, registering mechanism driven by said device, said casing having a liquid receiving chamber at one side of the measuring device and a cylindrical valve chamber at one side of the receiving chamber having a discharge passage communicating with the measuring device, the casing having a by-pass leading from the upper portion of the receiving chamber through said valve chamber and downwardly to said outlet passage, said valve chamber having end walls, an oscillatory valve within the second mentioned chamber having trunnions journaled in said end walls and a float within the first mentioned chamber connected with one of the trunnions and adapted when being raised by the liquid to a predetermined position to open said discharge passage and to close said by-pass.

12. In a fluid meter, the combination of a casing having inlet and outlet passages, a fluid measuring device arranged in said casing to transmit the fluid and to be actuated thereby, registering mechanism driven by said device, said casing having a substantially L-shaped liquid receiving chamber comprising intersecting laterals above the measuring device one of which has a discharge passage communicating with said measuring device, an oscillatory valve in one of the laterals for controlling an outlet thereof communicating with the measuring device, a float within the other lateral operatively engaging and detachably connected with the valve, the casing having a by-pass leading from the liquid receiving chamber to said outlet passage and arranged to be closed by the valve when the latter is moved to open said outlet and removable closures for openings in said laterals through which openings the valve and float are inserted for connection one with another.

13. In a fluid meter, the combination of a casing including upper and lower chambered sections cooperating to form an intermediate chamber extending above the bottom of the upper section, a measuring device disposed in the lower section arranged to receive and to be actuated by fluid discharged therein from the intermediate chamber, registering mechanism adapted to be actuated by said measuring device, said casing having a by-pass leading from the upper to the lower chamber and an automatic valve for controlling an outlet leading from the upper to the intermediate chamber, said valve being arranged to close said by-pass between its ends when moved to open said outlet.

EDGAR B. NICHOLS.